United States Patent Office 3,686,021
Patented Aug. 22, 1972

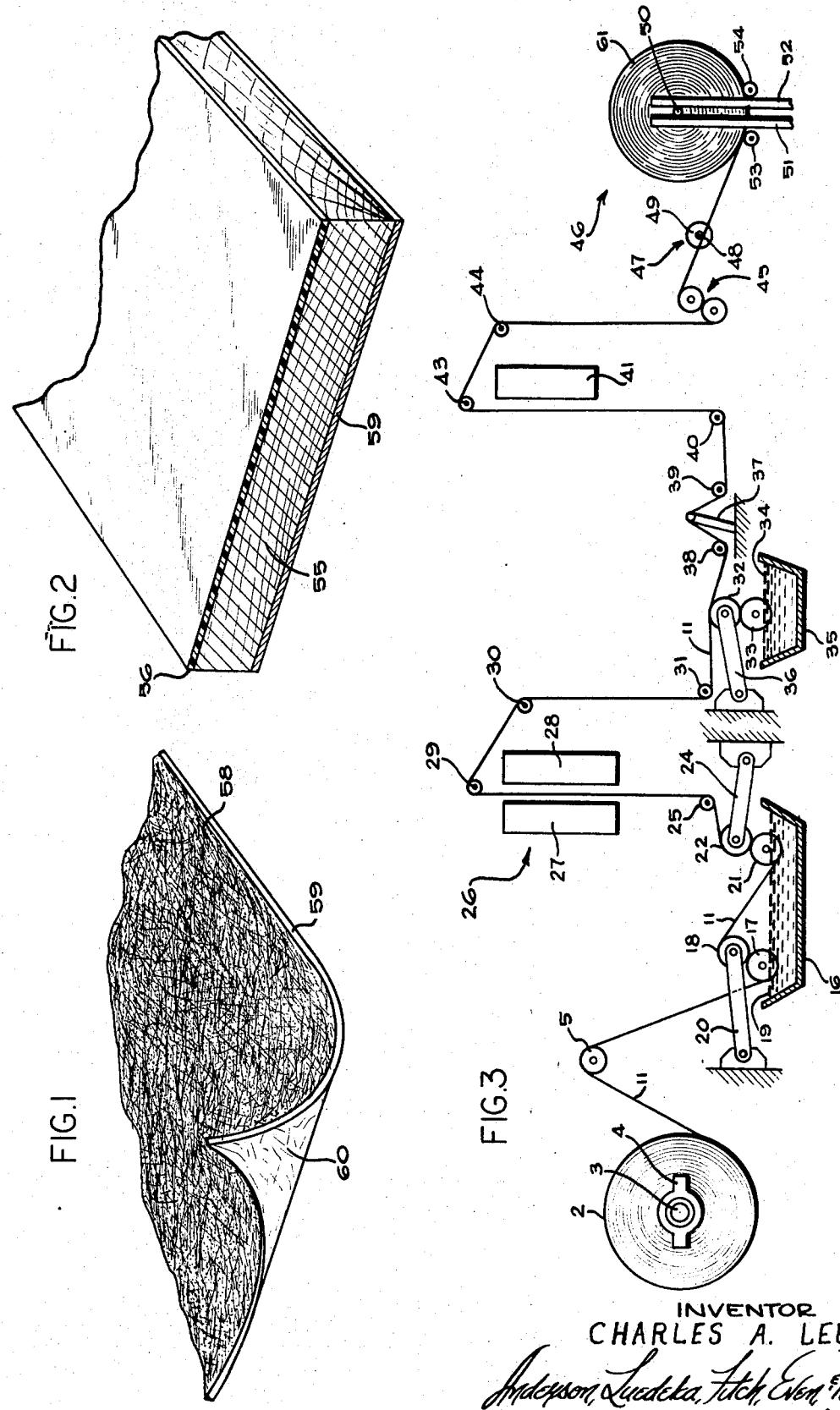

3,686,021
BACKING MATERIAL FOR LAMINATED
PRODUCTS
Charles A. Lee, Knoxville, Tenn., assignor to Southeastern Products, Inc., Knoxville, Tenn.
Continuation-in-part of application Ser. No. 662,759, Aug. 23, 1967. This application Feb. 17, 1970, Ser. No. 12,087
The portion of the term of the patent subsequent to July 28, 1987, has been disclaimed
Int. Cl. C03c 25/02
U.S. Cl. 117—76 T                    7 Claims

ABSTRACT OF THE DISCLOSURE

A strong, dimensionally-stable backing sheet material for use in laminated products is formed from a web of heat and moisture stable fibers impregnated with a thermosetting resin bonding the fibers one to another and partially filling the interstices therebetween. At least a portion of the fibers protrude from each side of the sheet to define uniform rough opposite surfaces, with the fibers and resin defining a void volume on each side of the sheet. The void volume on one side of the sheet serves to receive an adhesive for adhering the backing to its underlying ply in the laminated product. A second thermosetting resinous composition provided on the opposite side of the sheet at least partially fills the void volume on such side of the sheet and plugs the interstices between fibers.

This application is a continuation-in-part of co-pending application S.N. 662,759, filed Aug. 23, 1967 now Pat. No. 3,522,138.

This invention relates generally to laminated products and more particularly to a backing material for laminated products.

Laminated products, wood veneers for example, are usually laid up with an uneven number of layers, e.g., three, five or more layers, one of which is a central layer termed a core. The two outermost layers are referred to as faces, but more frequently are termed facing and backing, or facing sheet and backing sheet, to differentiate between the two flat sides of the product.

Co-pending application S.N. 662,759, filed Aug. 23, 1967, now Pat. No. 3,522,138 describes a crossbanding material useful as an intermediate ply in a veneered product. In general, when crossbanding is employed in a veneered product, it is applied on opposite sides of a core. The facing sheet is glued to the crossbanding on one side of the core and the backing sheet is glued to the crossbanding on the other side of the core.

Laminated products, in panel form, are usually fabricated by pressing together plies having adhesive interposed therebetween. For reasons of economy, several plied assemblies are stacked together and pressed per each cycle of the pressing equipment. After pressing, commonly the pressed panels are dead-stacked in storage. Thus it becomes very important that none of the adhesive used to bond the plies be permitted between panels in the stack so as to prevent bonding of adjacent stacked panels one to another. Separation of such bonded panels damages or completely destroys one or more panels, representing an economic loss.

In processes commonly used for producing laminated products, the backing sheet receives a layer of adhesive on that side of the sheet which is disposed in contact with the underlying ply of the laminated product. Since no adhesive can be tolerated on the opposite side of the panel, it is important that the backing provide an effective barrier against adhesive bleeding through the backing where it would be in position to cause bonding between stacked panels. The presence of such adhesive on the exterior surface of the laminated product can also be detrimental in subsequent use of the product.

Wood backing materials have been common in the prior art. Several varieties of cellulosic materials bonded with resins, particularly phenolic resins, and laminated, pressed or molded into sheet form have also been used heretofore as backing material. Such resin-bonded backing material normally exhibited greater strength in its machine direction (e.g., parallel to its direction of travel during its manufacture) than in its cross direction and significantly greater dimensional change in its cross direction than in its machine direction when subjected to moisture or temperature change. Plastic laminate facings also possess such directional quality. Therefore, when used in combination, resin-bonded cellulosic backings and plastic laminate facings have required careful and costly orientation during lay-up of the laminated product so as to avoid constructions which were unbalanced with respect to the respective strength and directionality of dimensional change of the plies disposed on opposite sides of the core. Frequently, time consuming tests have been necessary to ascertain the machine direction of such resin-bonded backing stock material, making its use highly undesirable.

The cellulosic fibrous matter present in wood and other prior art backings readily absorbs moisture. Resin-bonded cellulosic backings frequently are impervious across their thickness but will absorb appreciable moisture along their exposed edges, such moisture spreading into the interior of the backing sheet itself with concomitant dimensional change. Warping and delamination have been common in laminated products having such prior art backings. Further, these backings were generally brittle and required care in handling to avoid breaks and cracks through which moisture may pass into the interior of the laminate with resultant damage. Moreover, wood and certain other hydrophilic prior art backing materials absorbed adhesive non-uniformly, resulting in spotty adhesion of the backing to its underlying ply. In the regions of incomplete adhesions, the fibers separated in the cross direction, a defect known as checking, providing openings through which moisture entered the laminated product. Due to the relatively smooth, e.g., nontextured, surface of resin bonded cellulosic backings, adhesive applied to the backing for bonding it in the laminated product frequently accumulated in pools as distinguished from the desired uniform coating of adhesive. Such pools of adhesive produced blow-outs when the several plies were pressed together in subsequent laminating operations, hence loss of the product.

For similar reasons, good glue bonds between a backing and appurtenances, such as coving strips, legs, or reinforcements glued to the backside of veneered table tops, have been difficult to achieve heretofore. Even though well adhered to the core and to the appurtenance, prior art resin-bonded cellulosic backings tend to delaminate in the thickness of the backing, that is, between the glue bonds, and not provide a desirably strong product.

It is desirable for economic reasons and, in certain applications, for weight reasons, to produce veneered products of only three plies—a core and its facing and backing. The relatively low strength heretofore obtainable in three-ply veneers has limited the efficacy of such structures, however.

It is therefore an object of the present invention to provide a strong, moisture-impervious backing material. It is also an object to provide a backing material which is dimensionally stable under changing conditions of temperature or moisture. It is also an object to provide a backing material having opposite surfaces adapted for selected gluing functions. It is a still further object to provide a laminated product employing the backing material of the present invention.

Other objects and advantages of the invention will be apparent from the following description and drawings.

In the drawings:

FIG. 1 is an illustration of the backing material of the present invention with one corner of the material turned back to exhibit the differing surfaces of the material;

FIG. 2 is a view, part in section, of a veneered product employing the backing material of the present invention; and FIG. 3 is a representation of apparatus for the manufacture of the backing material of the present invention.

The backing material of the present invention comprises a web of heat and moisture stable fibers bonded together and a major portion of the interstices therebetween at least partially filled with a first thermosetting resin to form a coherent web having opposite surfaces lying in generally parallel planes, and a second thermosetting resin disposed on one surface of said web and plugging the interstices without extending completely through the web to the opposite surface thereof.

The fibrous web of the present backing is, in the preferred form of the invention, composed of randomly disposed, continuous filaments bonded together to form a relatively flat web, such as nonwoven polyester web known as spunbonded and sold under the trademark Reemay by E. I. du Pont de Nemours and Company, Wilmington, Del. The present invention is not limited to a spunbonded polyester web as the web may also be formed from other staple length or longer randomly oriented continuous filaments or synthetic fibers, such as rayon, polyethylene or glass. Long filaments provide increased strength and can be formed into webs or mats with the filaments randomly intertwined with other filaments. A number of techniques may be employed to form the nonwoven sheet such as air forming, water forming, or mechanical spreading to obtain good cross machine strength, uniform density and permeability with rough even outer surfaces for the web.

Prior to being filled with the thermosetting resin, the web is very porous and has a large number of relatively uniformly sized and spaced openings, many of which communicate between the opposite web surfaces. Thus, the void volume of the web is relatively large prior to reception of the first resin. Such openings facilitate a relatively uniform distribution of the resin throughout the body of the web permitting thorough impregnation of the web by the resin. As will be seen from the given examples, the web is initially loaded with resin by being dipped into a liquid resin bath with the result that the filaments are coated and the interstices between the fibers are substantially reduced. The surfaces of the web, however, are not glazed, i.e., smooth, surfaces. Indeed, portions of the fibers protrude from the body resin-coated fibers and form pockets or troughs. The surfaces appear pocked with depressions, i.e., void openings, and the thicker webs have a surface which could be described as textured.

The selected fibers are relatively heat and moisture stable, as contrasted with fibers of cellulosic materials heretofore employed for the backings. That is, the fibers do not absorb moisture in the manner of cellulosic fibers and are not adversely affected by the normal heat experienced during a laminating operation or otherwise. Also of considerable importance to the invention are the characteristics of toughness and integrity exhibited by the chosen webs which enable the backing product to be flexed and molded about curved surfaces without chipping or delaminating, as contrasted with the more brittle paper-base backing materials of the prior art. The relatively long fibers comprising the webs of the present backing material provide good multi-directional strength in the backing. Because the fibers of the web are not segregated into layers, the web does not delaminate under shear stresses.

For producing backing material useful in the furniture industry, the web may comprise polyester fibers which, prior to loading with resin, have a weight between about 1.3 and 6 ounces per square yard and a thickness between about 11 and 32 mils. To afford good tensile strength in the backing material, the web may have tensile strength of about 25 pounds per inch in each of the machine and cross machine directions. These webs prior to impregnation are very open and porous, and may have Frazier air permeabilities between about 120 and 780 c.f.m./ft.$^2$ at ½ inch $H_2O$ differential.

In accordance with the present invention, the web is impregnated initially with one (or a mixture) of various plastics such as, for example, ureaformaldehyde, or a polyester, acrylic, or epoxy resin. It is preferred that the web be loaded with a plastic material such as a thermosetting resin which cures easily, particularly when heated, as will be seen in the examples provided hereinafter. It has been found that through controlled accretion of resin, the void volume of the web can be selectively partially filled to produce a controlled, limited amount of porosity, the pores preferably extending completely through the web thickness and providing openings or passageways communicating between the opposite surfaces of the web. Further, the resin coats the fibers of the web and bonds the fibers one to another to form a strong coherent web. The resin accretion is limited so that portions of fibers protrude from the resinous mass and define multitudinous interconnecting depressions or troughs extending over the entire surface on each side of the flat web. These troughs on one side of the web serve as interconnecting channels along which adhesive flows when the surface with adhesive thereon is pressed against an underlying ply during lay-up of a veneered product, thereby effecting uniform and thorough distribution of the adhesive between the plies.

It has been discovered that the impregnated porous web can be made moisture-impervious by surface-coating one side of the porous web with a measured quantity of a resin or resinous mixture to close essentially all the pores of the web. In accordance with this invention, this surface coating should penetrate into the pores of the web and fill or plug essentially every pore, but without extruding through the pores to the opposite side of the web and block or otherwise destroy the interconnecting channel system thereof. It is not necessary that the resin completely fill each pore; rather the surface coating is preferably applied such that sufficient pores are closed, either by filling or covering, as will render the backing an effective barrier against the flow of moisture or liquid (e.g. adhesive) therethrough.

In the preferred surface-coating, the outermost surface of the backing retains a significant capability to receive glued appurtenances thereon. This result can best be achieved by including in the surface-coating mixture a resin which is compatible and forms a strong bond with the adhesives most frequently encountered in gluing appurtenances to a laminated product, for example, ureaformaldehyde. The adhesion capability of this outermost surface can be enhanced by providing a void volume therein into which an adhesive can enter and interlock with the backing. Such void volume, when in the form of pockets or troughs, also increases the surface area available for contact by the adhesive, thereby increasing the bond.

The desired surface coating is best deposited on the porous impregnated web by "kiss-coating," a procedure wherein the web is passed over, and wrapped approximately 40 degrees around, a meter roll whose surface carries liquid resin. As will appear more fully hereinafter, the meter roll preferably is rotated at a tangential speed greater than the linear speed of the web so as to deposit the desired quantity of liquid resin on the flat web. The liquid-bearing web may be doctored to effect the desired dispersion and penetration of the resin over the web surface and into the pores. It is important that the resin or resinous mixture possess the necessary film-forming properties. A preferred resin is set forth in the example provided hereinafter.

Many untreated webs are not very stiff and are subject to wrinkling, but after the loading and curing of the plastic material, the webs are stiffer and resist being wrinkled. For example, the stiffness of an untreated polyester web may range from 47 to 844 milligrams and after treating, the stiffness of the impregnated and coated web may be as high as 4,987 milligrams. For comparison, a brass shim stock 0.002 inch thick has a stiffness of 488 milligrams. Such increased stiffness in the backing product facilitates handling of the backing during fabrication with core and veneer. While becoming relatively stiff, the treated web still retains sufficient flexibility and elasticity to be molded about curved surfaces.

FIG. 1 presents one view of the present backing material 59 and shows the relatively heavily textured surface on the uncoated side 58 thereof and the significantly less textured coated side 60. When laid up in a laminated panel, side 58 of the backing material receives the adhesive employed to join the backing to its underlying ply, e.g., core, in the veneered product.

Referring now in detail to the apparatus illustrated in FIG. 3, a fibrous web 11 is drawn from a supply roll 2, which is mounted on a support shaft 3. A brake 4 is provided on the shaft 3 to provide a sufficient resistance to maintain the web in a flat condition.

From the supply roll 2, the web 11 is fed to and over an idler roll 5 and then downwardly from the idler roll 5 into an immersion tank 16 around the underside of a lower dip roll 17 of a first set of nip rolls 17 and 18. The web 11 is trained around the roll 17 through the nip and over the upper roll 18, as illustrated. The lower portion of roll 17 is maintained under the surface of the impregnant. (The surface of the impregnant is shown by the broken lines 19 in FIG. 1.) The roll 18 is supported on a pair of pivotally mounted arms 20 (only one shown) so that the weight of roll 18 is applied to the nip so as to compress the web 11 thereby driving any entrained air from it and forcing the impregnant into the interior of the web. Means such as air mount cylinders (not shown) may be provided for the arms 20 and so as to adjust the pressure in the nip.

After leaving the surface of roll 18, the web 11 is again submerged in the impregnant in a similar manner by means of a pair of metering rolls 21 and 22. More specifically, the web 11 wraps the lower metering roll 21 under the surface 19 of the impregnant and moves upwardly to the nip formed by the rolls 21 and 22. At this nip, the web 11 is subjected to controlled pressure to control the amount of impregnant left in the web 11. To this end, the upper roll 22 is journaled for rotation about its longitudinal axis on pivotally mounted support arms 24 (only one shown) whose lowermost position is determined by air mount cylinders (not shown) connected to the support arms 24. Thus, the air mount cylinders may be adjusted to vary the distance between the upper roll 22 and the lower roll 21 with the result that the pressure in the nip is controlled in a precise manner. Preferably, the rolls 21 and 22 are jacketed, one with Teflon and the other with rubber to provide resilient pressure surfaces which aid in metering. Thus, the pick-up of impregnant may be periodically adjusted to compensate for other change such as, for example, a change in the permeability of the raw material or a change in the speed of travel of the web.

The reverse wrap of the web about the sets of rolls 17–18 and 21–22 effects sufficient friction so that changes in the speed of the rolls permits accurate adjustment of the draw on the web in the impregnating tank.

One factor which is desirably controlled in the impregnation step is the solids content of the impregnant, e.g., resin. Solids may tend to settle out causing a change in the viscosity of the impregnant and hence a change in the pick-up in the web. The preferred manner of preventing settling or accumulation of solids is to continuously recirculate and agitate the resin.

Having been impregnated with the controlled amount of the impregnant, the web 11 moves upward from the nip of the rolls 21, 22 to engage the face of a rotatable, bowed roll 25 which serves to deform the wet web in the controlled manner which is important in obtaining a flat, dimensionally stable dried sheet. The bowed roll 25 exerts outwardly directed forces which tend to spread the web to gradually increase the length of travel of the web from its marginal edges to the center line of the web prior to the time the web enters the drier station 26. It has been found satisfactory for a 48 inch wide web to provide a bow in the shaft giving a maximum throw of approximately 1 inch. As illustrated in the drawing, the bowed roll 25 is disposed at the lower end of the vertical run of travel of the web through the drier station 26.

The drier station 26 preferably includes a pair of vertically disposed spaced-apart heater banks 27 and 28 positioned on opposite sides of the web 11 to heat both sides thereof. Each of heater banks 27 and 28 includes a blower (not shown) positioned in its lower end for circulating air between the heater banks so as to remove moisture from the atmosphere between the banks thereby facilitating drying.

At the top of the drier 26, above the banks 27 and 28 there is provided an idler roll 29 around which the dried web is trained. From the idler roll 29 the web 11 travels downwardly over further idler rolls 30, 31 and then passes to a surface-coating operation.

Alternatively, the impregnated web may be accumulated, for example on reels, for later passage through the surface-coating operation or it may be passed directly from the drying station to the surface-coating. In the illustrated embodiment, the dried, impregnated web is passed from idler roll 29 downwardly and under an idler roll 31. From idler roll 31, the web feeds to and over the upper surface of a meter roll 32 disposed above, but in physical contact with, a fountain roll 33. Preferably, both rolls are rubber-coated. The lower portion of roll 33 is maintained beneath the surface 34 (indicated by a dotted line) of a liquid resin contained in a tray 35. Roll 32 is rotatably mounted by pivotable arms 36, whose vertical position is adjustable by air mount cylinders (not shown) so as to establish and maintain roll 32 in contact with roll 33. As the rolls 32, 33 rotate in contact, a quantity of resin is picked up by roll 33 from tray 35 and transferred to roll 32. The quantity of resin transferred is determined by the pressure exerted by roll 32 as it is held in contact with roll 33 by arms 30.

Roll 32 preferably is driven at a speed faster than the speed of the web 11, i.e., the tangential speed of the roll is faster than the linear speed of web travel. This arrangement provides a pond of resin mixture at the nip between the roll and web, and uniformly distributes the resin onto the web.

Directly, upon leaving roll 32, the web is passed over a doctor blade 37 flanked on either side thereof by idler rolls 38 and 39, which serves to restrain the web in contact with the blade. Excessive resin is scraped away by the doctor blade. Further, the doctor blade functions to smooth the remaining resin and force resin into the pores of the web. The pressure between the web and doctor blade depends in part upon the porosity of the web, the viscosity of the applied resin and the tendency of the resin to wet the web structure.

The web with its resin coating on one side is fed around an idler roll 40 and directed along a vertical path through a dryer 41. Only that side of the web which carries the surface coating is heated so as to dry and partially cure the resin surface coating without damaging the uncoated surface. The residence time of the web within the dryer can be adjusted by selection of the length of the dryer and preferably is chosen such that the resin coating will be only partially cured. Backing material intended for use in hot press laminating operations will receive less curing than will backing material intended for use in cold press laminating operations.

From the dryer, the web passes over a series of idler rolls 43 and 44, through a set of draw rolls 45, and thence to a winding stand 46.

Between the draw rolls 45 and the winding stand 46, there is provided a slitting means 47 dividing the web 11 into a plurality of strips. The preferred form of slitter comprises a rotatable shaft 48 which carries one or more slitting discs 49, which have sharpened cutting edges for slitting the web. The slitting discs 49 are desirably driven by a separate drive motor (not shown) through an arrangement of shafts and belts (not shown).

The preferred form of winding stand 46 is a so-called surface winder which provides a uniform winding speed despite an increasing diameter of web roll 61 being formed. The leading end of the web 11 is fastened to a core (not shown) supported on a shaft 50, which is guided to move vertically between opposed spaced guides or brackets 51 and 52. The roll core and material rolled thereon, is centered on and bears against a pair of lower support and winder drive rolls 53 and 54. The drive rolls are driven to have a surface speed corresponding to the reference speed established by the draw rolls 45.

In operation, the web 11 is threaded through the machine in the manner which has been described and the desired speed is established by the draw rolls 45. The metering rolls 21–22 are adjusted to provide the desired metering action of impregnant through the action of their air mount cylinders. After this has been accomplished, the speed of the rolls 21–22 is adjusted so as to provide a vertical run in the dryer of the web 11, which is in a condition of neutral tension. With most materials, the web shrinks as it is dried and therefore the rolls 21–22 ordinarily operate at a slightly greater peripheral speed than the draw rolls 45. Simultaneously, with this adjustment, the adjustment of the nip rolls 17–18 is made and since the material normally stretches somewhat after being wetted, it is normally found that these rolls should be driven at a speed slightly less than the speed of the rolls 21–22. Also simultaneously, the pressure between metering rolls 32 and 33 is adjusted along with their peripheral speeds, to select the proper quantity of resin to be applied to the web. Likewise, the pressure between the web and doctor blade is set. In order to obtain a tight wrap on the roll of the final product, the drive rolls 53–54 are driven at a slightly faster peripheral speed than the draw rolls 45, so as to provide tension which facilitates slitting and insures a tight wrap on the take-up roll.

The void volume of the uncoated side of the present backing receives and evenly distributes adhesive over the surface of the backing for veneering purposes. In the course of pressing together the plies of a veneered product, the adhesive flows along the interconnected troughs and evenly distributes itself between the backing and its underlying ply. The adhesive also flows into and fills that portion, if any, of a pore which is not completely filled by the resin surface coating. Thus, when laid up in a veneered product, the backing uniformly adheres to its underlying ply. Since the adhesive is received in a controlled void volume on the backing, one can readily determine the quantity of adhesive per unit area of backing necessary to produce an acceptable bond. The ability to apply a measured quantity of adhesive with certainty of obtaining complete adhesion, allows the veneer manufacturer to realize significant savings by eliminating the production of faulty panels whose backing is defectively applied due to spots of excessive adhesive and spots having insufficient adhesive. Because no adhesive bleeds through the backing, several panels may be stacked for pressing during a single operation of the press without disastrous bonding of the panels to each other.

Significantly, the veneering adhesive also enters the web pores to contact the resin of the surface coating. Consequently, the veneering adhesive bonds to the web proper and also bonds to the surface coating at the many spaced points where the adhesive and surface coating have entered the pores communicating between the web surfaces. This physical arrangement provides limited, but direct, bonding between the core and the surface coating itself thereby increasing the strength of the laminated product and decreasing its tendency to delaminate.

The exterior surface of the present backing presents an aesthetically pleasing appearance, yet retains sufficient roughness of surface to permit the gluing of objects thereto. The resin coating on this outermost surface tenaciously joins with the common adhesives used to join appurtenances to the backing.

Additionally, the resin-bonded, intertwined filaments produce a very strong backing, the strength being essentially equal along the width and length of the backing sheet. It is permissible, therefore, to lay up the present backing in a panel assembly without regard to the machine direction of the backing. This strength of the backing, as derived from its physical structure, transfers to the veneered product of which the backing is made a part. Consequently, three-ply panels of improved strength-to-weight ratios are possible through use of the present invention. An example of a three-ply panel is depicted in FIG. 2 showing a wood core 55 having a plastic facing 56 glued to one side thereof and a backing 59 of the type described herein glued to the other side thereof to create a three-ply veneered product.

Another important aspect of the backing layer is its relative incompressibility after impregnation so as to withstand the large pressures encountered during fabrication of veneered products. The treated backing fibers are preferably harder than wood core so that the rough surface of the treated web adjacent the core will embed in the wood core. Such embedding aids in the bonding.

The following example is given for illustrative purposes with the understanding that the present invention is not to be limited to this example. As used in the present application, the term "resin" includes solutions of one or more resins or solutions comprising one or more thermosetting resins and relatively inert matter such as clay or pigment. Minor parts of other ingredients such as a catalyst, wetting agent, or antifoaming agent may be included also.

EXAMPLE

A spunbonded polyester web 11 of three denier filaments weighing 2.2 oz./yd.$^2$, was stripped from a supply roll 2 and fed at a speed of about five feet per minute, in a continuous manner into and through a first liquid resin in a trough 16. The web was fed beneath roll 17 in the trough and over roll 18 immediately above the surface 19 of the resin, the resin filling most of the voids in the web. Following this first dip, the web was fed under roll 21 to dip the web in the resin a second time and then fed vertically upward through a first oven 26 maintained at a constant temperature of about 380° F. The oven had sufficient length to cure the resin as the web continued to travel at about 5 feet per minute. From the oven the impregnated web passed to a roll 32 rotating as a tangential speed of about 9 feet/minute and surface-coated on one side with a second resin. Excessive resin was removed from the web as it was passed over a doctor blade 37 which also aided partial infusion of the mixture into the pores of the web. The coated web was then fed into a second oven 41 maintained at a constant temperature of about 300° F.

In the second oven 41, heaters were provided on only that side of the web which was coated so as to avoid destructively heating the uncoated web surface. The oven 41 had sufficient length to effect partial curing of the resin coating as the web continued to travel at 5 feet/ minute. From the oven the web was passed through a slitting operation to the winding station where the slit web was collected in rolls.

The formulation of resin used to impregnate the web was as follows:

Ingredients: Percent (weight)
- Acrylic resin _____ 6.8
- Starch _____ 5.2
- Water _____ 50.3
- Clay _____ 25.7
- Pigment _____ 11.3
- Antifoaming agent _____ 0.3
- Catalyst (ammonium chloride) _____ 0.2
- Wetting agent _____ 0.2

The mixture was prepared by mixing together acrylic resin sold under the trade name Rhoplex HA–16 by Rohm & Haas Company, Philadelphia, Pa., with the water and other ingredients, the clay being added last and slowly with agitation for a time sufficient to insure a homogeneous mixture. A preferred starch is Kofilm 80 available commercially from National Starch and Chemical Company, New York, N.Y. Triton X–100, sold by Rohm & Haas Company, was employed as the wetting agent.

Prior to impregnation, the web was very porous and had a Frazier air permeability of 480 c.f.m./ft.$^2$ at ½ inch H$_2$O. After treatment, the permeability was reduced to 9.4 c.f.m./ft.$^2$, leaving the web with sufficient void openings to serve as glue receptors. The void openings were interconnected. The web had a density of 7.2 oz./yd.$^2$, indicating a weight gain of 5.0 oz./yd.$^2$ of impregnant. The outer surfaces of the web remained rough, i.e., unglazed. The hills and valleys making the rough surface were formed by the filaments of the web so that the depth of the surface depressions was about the diameter of a filament. In this example, the web stiffness increased from 844 to 1600 milligrams, as a consequence of being impregnated by the aforedescribed formulation.

The resin which was surface-coated onto the web was formulated as follows:

Ingredient: Percent (weight)
- Melamine formaldehyde _____ 64.4
- Acrylic _____ 12.8
- Clay _____ 16.1
- Catalyst (ammonium chloride) _____ 0.2
- Pigment _____ 6.4
- Wetting agent _____ 0.1

This resin was prepared by mixing together Parez 613, a melamine formaldehyde available from American Cynamid and Rhoplex HA–16, an acrylic resin, along with Triton X–100 wetting agent. The clay was added slowly to the liquid resin with agitation, followed by the addition of the pigment as agitation was continued. Finally, water was added to adjust the viscosity of the mixture to about 5500 centipoises.

The surface-coated web exhibited a uniform continuous coat. Its stiffness was 2000 milligrams. The base weight of the coated web was 8.7 oz./yd.$^2$, indicating a weight gain of 1.5 oz./yd.$^2$ of resin coating. The coated product exhibited a Frazier air permeability of about 0.1 c.f.m./ft.$^2$ indicating that essentially all interstices (pores) were plugged. The quantity of coating applied to the web, however, did not glaze the outer surface of the backing. Shallow, void openings remained in the coat itself to serve as receptors for adhesive during any subsequent gluing operation. The total volume of these void openings was considerably less than the volume of the void openings on the uncoated side of the backing.

The coated side presented a pleasing appearance. Its surface exhibited a slight sheen as if varnish or lacquer had been applied to it.

The surface-coated sheet was laid up in a veneered product by gluing a 0.036 inch thick facing sheet of decorative laminate and the present product (0.024 inch thick) on opposite sides of a 0.625 inch thick particle board core. The adhesive employed was ureaformaldehyde applied in a thin uniform layer on the facing and backing sheets in the amount of 30–35 grams/sq. ft. A pressure of 135 lbs./in.$^2$ was applied to the laid-up veneers while heating the same at 250° F. for 7 minutes.

Matted mineral fiber (glass) webs of 15–20 mil thickness have been successfully impregnated and surface-coated by the procedures and using the resin formulations set forth above. These webs were of the "jackstraw" mat type comprising chemical type C fibers and sold under the trademark Fiberglas and designated M514 surface bonded mat by Owens Corning Fiberglas Corporation, Toledo, Ohio.

While a preferred embodiment has been shown and described, it will be understood that there is no intent to limit the invention by such disclosure but, rather, it is intended to cover all modifications and alternate constructions falling within the spirit and scope of the invention as defined in the appended claims. For example, thermosetting resins other than those recited in the example may be employed without departing from the scope of the invention. Also, the relative proportions of the respective ingredients of the impregnant resin and the surface-coating resin may be altered within reasonable limits without deleteriously affecting the respective function served by each resin.

What is claimed is:

1. A backing sheet material for use with veneer adhesive in the manufacture of veneered products comprising a porous mat of heat and moisture stable filaments which are intertwined to form a sheet, the individual filaments of said sheet being randomly oriented in relation to other filaments whereby each filament crosses a multiplicity of other filaments at varying angles and in different directions, said sheet being loaded with a thermosetting resin which is cured in situ to render said mat substantially incompressible during veneering, said resin coating the individual filaments and effectively bonding them together to provide an integral three-dimensional structure with void openings adjacent the surfaces of the sheet to serve as receptors for the veneer adhesive and to permit migration of the veneer adhesive laterally of the sheet, and a thermosetting resin coating disposed on one surface of said sheet and substantially filling the void openings on that surface of said sheet to essentially fill said void openings without extending through said sheet to the opposite surface thereof and reducing the air permeability of said sheet to produce an effective moisture barrier, whereby the receptors on the uncoated side of said sheet permit migration of the veneer adhesive laterally along that surface of the sheet whereby adhesive can bond to the filaments of said sheet over all of that surface.

2. The backing sheet material of claim 1 wherein said sheet after impregnation and prior to being coated with thermosetting resin has an air permeability in the range of about 1 to 20 c.f.m./ft.$^2$ at ½ inch H$_2$O pressure differential.

3. The backing sheet material of claim 1 wherein said thermosetting resin disposed on said one of said surfaces of said sheet extends into at least a major portion of the interstices between the filaments by a distance less than the thickness of said sheet to plug such interstices.

4. The backing sheet material of claim 3 wherein said thermosetting resin has a pigment added thereto.

5. The backing sheet material of claim 1 wherein said thermosetting resin coating disposed in said void volume on one of said sheet surfaces comprises a mixture of resins.

6. The backing sheet material of claim 1 wherein said filaments comprise long continuous synthetic filamentary strands intertwined one with another.

7. The backing sheet material of claim 1 wherein said filaments are glass.

References Cited
UNITED STATES PATENTS

| | | | |
|---|---|---|---|
| 2,769,742 | 11/1956 | Helbing. | |
| 3,318,727 | 5/1967 | Boenig et al. | |
| 3,391,056 | 7/1968 | Robinson | 161—232 |
| 2,728,698 | 12/1955 | Rudner | 154—43 |
| 3,522,138 | 7/1970 | Lee | 161—92 |

ROBERT F. BURNETT, Primary Examiner

J. J. BELL, Assistant Examiner

U.S. Cl. X.R.

117—68.5, 140 R; 161—72, 93, 151, 170, 270